United States Patent
Abe

(10) Patent No.: US 11,811,228 B2
(45) Date of Patent: Nov. 7, 2023

(54) SOLAR POWER GENERATION CONTROL DEVICE

(71) Applicant: HONDA MOTOR CO., LTD., Tokyo (JP)

(72) Inventor: Noriyuki Abe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 17/203,134

(22) Filed: Mar. 16, 2021

(65) Prior Publication Data
US 2021/0296894 A1  Sep. 23, 2021

(30) Foreign Application Priority Data
Mar. 19, 2020 (JP) ................................ 2020-050283

(51) Int. Cl.
*H02J 3/00* (2006.01)
*G01C 21/34* (2006.01)
*B60L 8/00* (2006.01)

(52) U.S. Cl.
CPC .............. *H02J 3/004* (2020.01); *B60L 8/003* (2013.01); *G01C 21/3469* (2013.01); *H02J 2300/24* (2020.01); *H02J 2310/48* (2020.01)

(58) Field of Classification Search
CPC .... H02J 3/004; H02J 2300/24; H02J 2310/48; H02J 7/35; H02J 7/007188; B60L 8/003;
(Continued)

(56) References Cited

U.S. PATENT DOCUMENTS

2013/0285841 A1* 10/2013 Kirsch ................... G08G 1/143
340/932.2
2016/0181970 A1* 6/2016 Sato ..................... B60L 15/2045
136/246
(Continued)

FOREIGN PATENT DOCUMENTS

JP    2000-353295 A    12/2000
JP    2014-036563 A     2/2014
(Continued)

OTHER PUBLICATIONS

Sep. 5, 2023, Translation of Japanese office Action issued for related JP Application No. 2020-050283.

*Primary Examiner* — Mohammad Ali
*Assistant Examiner* — Dhruvkumar Patel
(74) *Attorney, Agent, or Firm* — Paratus Law Group, PLLC

(57) ABSTRACT

A solar power generation control device, controlling a solar power generation system configured to charge a power storage device of a vehicle with electric power generated by a solar cell provided in the vehicle, includes: an acquisition unit that acquires environmental information on weather or a planimetric feature around the vehicle; a prediction unit that predicts a change in solar radiation state of the vehicle based on the environmental information acquired by the acquisition unit and a moving state of the vehicle; and a control unit that controls an operation mode of the solar power generation system, including a first mode, in which the power storage device is charged with electric power generated by the solar cell, and a second mode, in which power consumption of the solar power generation system is lower than in the first mode, based on a prediction result of the prediction unit.

10 Claims, 5 Drawing Sheets

(58) Field of Classification Search
CPC ......... B60L 2240/662; B60L 2240/667; G01C 21/3469; Y02E 10/56; Y02E 70/30; Y02T 10/70; Y02T 10/7072; Y02T 10/72; Y02T 90/16; H02S 10/40
See application file for complete search history.

(56) References Cited

U.S. PATENT DOCUMENTS

| | | | | |
|---|---|---|---|---|
| 2018/0136663 A1* | 5/2018 | Mattila | ................... | B60L 53/51 |
| 2018/0233920 A1* | 8/2018 | Kodama | ................. | H02S 50/00 |
| 2019/0084427 A1* | 3/2019 | Dudar | ................ | H01M 10/465 |
| 2019/0190308 A1* | 6/2019 | Miyoshi | .................... | H02J 7/35 |
| 2019/0329661 A1* | 10/2019 | Yum | .................... | G05B 13/048 |

FOREIGN PATENT DOCUMENTS

| | | | | |
|---|---|---|---|---|
| JP | 2014165948 A | * | 9/2014 | |
| JP | 2015-085707 A | | 5/2015 | |
| JP | 2016-140193 A | | 8/2016 | |
| WO | WO-2011010392 A1 | * | 1/2011 | .......... B60L 15/2045 |
| WO | WO 2015/063556 A1 | | 5/2015 | |
| WO | WO-2018051076 A1 | * | 3/2018 | ......... G01C 21/3415 |

\* cited by examiner

| TYPE | SUB-TYPE | DISTANCE CONDITION (DISTANCE FROM VEHICLE) | OPERATION MODE |
|---|---|---|---|
| HIGH-LEVEL CLOUD | CIRRUS | — | STARTUP MODE |
| | CIRROCUMULUS | — | STARTUP MODE |
| | CIRROSTRATUS | — | STARTUP MODE |
| MIDDLE-LEVEL CLOUD | ALTOCUMULUS | — | STARTUP MODE |
| | ALTOSTRATUS | — | PAUSE MODE |
| | NIMBOSTRATUS | — | PAUSE MODE |
| LOW-LEVEL CLOUD | STRATOCUMULUS | PREDETERMINED DISTANCE OR MORE | STARTUP MODE |
| | | LESS THAN PREDETERMINED DISTANCE | PAUSE MODE |
| | CUMULUS | — | STARTUP MODE |
| | STRATUS | — | PAUSE MODE |
| | CUMULONIMBUS | PREDETERMINED DISTANCE OR MORE | STARTUP MODE |
| | | LESS THAN PREDETERMINED DISTANCE | PAUSE MODE |

SOLAR POWER GENERATION CONTROL DEVICE

CROSS-REFERENCE TO RELATED APPLICATIONS

The present application claims the benefit of priority of Japanese Patent Application No. 2020-050283, filed on Mar. 19, 2020, the content of which is incorporated herein by reference.

TECHNICAL FIELD

The present invention relates to a solar power generation control device that controls a solar power generation system.

BACKGROUND ART

In the related art, there is a solar power generation system that includes a solar cell and a power storage device, and charges the power storage device with electric power generated by the solar cell. Such a solar power generation system, for example, is started when irradiation light to the solar cell is detected (specifically, when an output voltage of the solar cell is larger than a predetermined voltage value), and performs charging of the power storage device with the electric power generated by the solar cell. JP-A-2015-85707 discloses that such a solar power generation system is provided in a vehicle.

If it is set to start the solar power generation system after detecting the irradiation light to the solar cell, since the solar power generation system is not started even though it is a condition where the solar cell can generate power, the power storage device cannot be charged with the electric power generated by the solar cell, and there is room for improvement in this respect.

SUMMARY

The present invention provides a solar power generation control device capable of increasing an opportunity of charging a power storage device with electric power generated by a solar cell.

Solution to Problem

According to an aspect of the present invention, there is provided a solar power generation control device, controlling a solar power generation system configured to charge a power storage device of a vehicle with electric power generated by a solar cell provided in the vehicle, an operation mode of the solar power generation system including: a first mode in which the power storage device is charged with electric power generated by the solar cell; and a second mode in which power consumption of the solar power generation system is lower than in the first mode, the solar power generation control device including: an acquisition unit that acquires environmental information on weather or a planimetric feature around the vehicle; a prediction unit that predicts a change in solar radiation state of the vehicle based on the environmental information acquired by the acquisition unit and a moving state of the vehicle; and a control unit that controls the operation mode of the solar power generation system based on a prediction result of the prediction unit.

According to the aspect of the present invention, it is possible to increase an opportunity of charging a power storage device with electric power generated by a solar cell.

BRIEF DESCRIPTION OF THE DRAWINGS

FIG. 5 illustrates an example of a control table.

DESCRIPTION OF EMBODIMENTS

Figure 1:
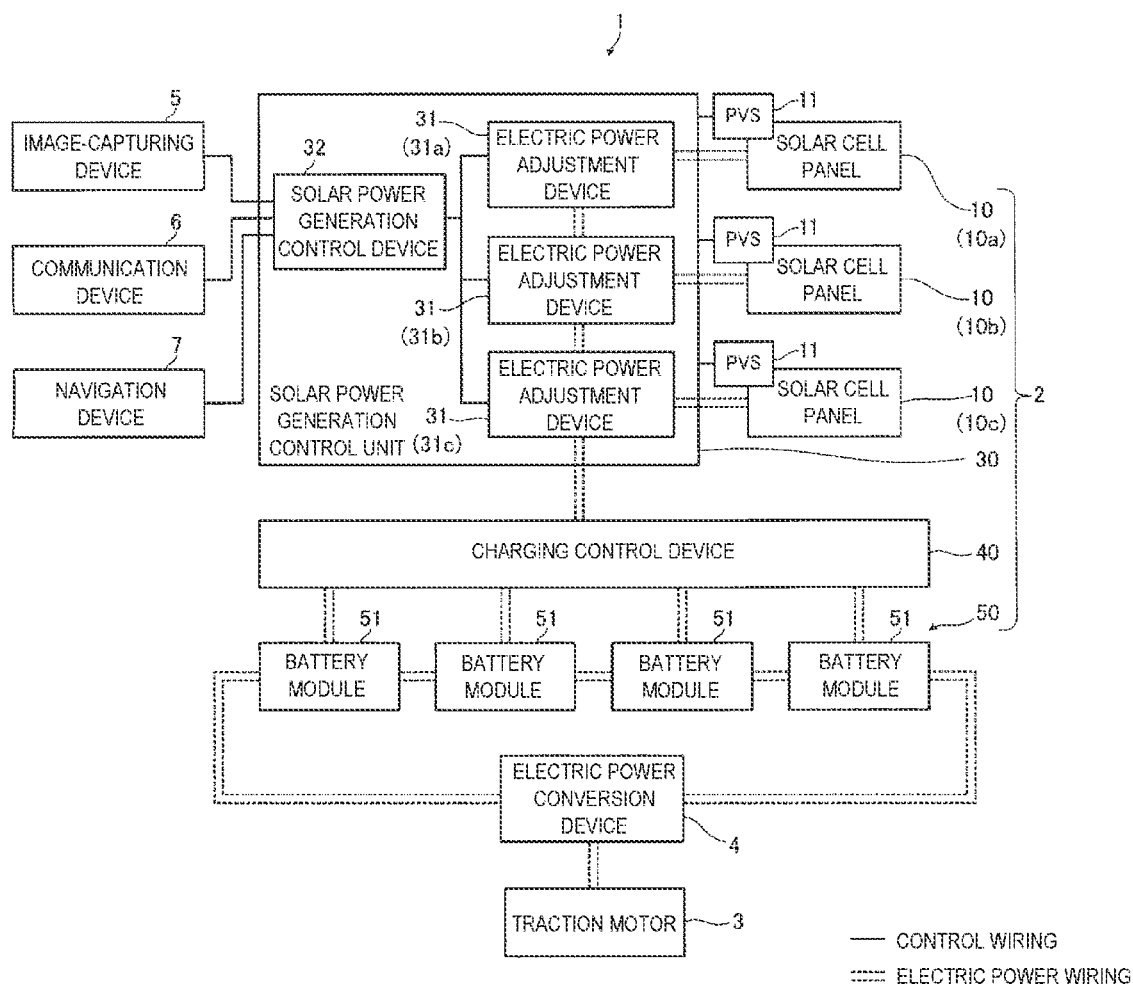
FIG. 1 is a diagram illustrating an example of a vehicle provided with a solar power generation system controlled by a solar power generation control device according to an embodiment of the present invention.

Hereinafter, an embodiment of a solar power generation control device according to the present invention will be described in detail with reference to the drawings. In the following description, front-rear, left-right, and up-down are described according to directions viewed from a user of the vehicle. In the drawings, a front side of the vehicle is indicated as Fr, a rear side as Rr, a left side as L, a right side as R, an upper side as U, and a lower side as D.

First, a vehicle provided with a solar power generation system controlled by a solar power generation control device according to an embodiment of the present invention will be described with reference to FIG. 1. In FIG. 1, a solid line indicates a control wiring, and a double dotted line indicates an electric power wiring.

In FIG. 1, a vehicle 1 includes a solar power generation system 2 capable of generating power using irradiation light to the vehicle 1 (hereinafter, also simply referred to as irradiation light), and a traction motor 3 (for example, a three-phase AC motor) that drives by using electric power generated by the solar power generation system 2. The vehicle 1 is an electric vehicle that can run under motive power of the traction motor 3. The irradiation light is, for example, sunlight of the sun serving as alight source. The sunlight may include direct light that directly reaches the ground (that is, the vehicle 1) and scattered light that reaches the ground after being scattered and reflected by clouds, dust in the atmosphere, and the like.

As illustrated in FIG. 1, the solar power generation system 2 includes a solar cell panel 10, a solar power generation control unit 30, a charging control device 40, and a battery 50.

The solar cell panel 10 is an example of a solar cell in the present invention. The solar cell panel 10 is configured with, for example, a plurality of solar cells connected in series that convert light energy into electric power, and outputs electric power generated by the plurality of solar cells in the irradiation light to the solar power generation control unit 30. In the vehicle 1, a plurality of such solar cell panels 10 are provided, and each of the plurality of solar cell panels 10 is connected to the solar power generation control unit 30.

Specifically, the solar cell panel 10 includes a solar cell panel 10a, a solar cell panel 10b, and a solar cell panel 10c. The solar cell panel 10a, the solar cell panel 10b, and the solar cell panel 10c are arranged on different surfaces of a vehicle body. An example of arrangement positions of the solar cell panel 10a, the solar cell panel 10b, and the solar cell panel 10c will be described later with reference to FIG. 2.

Although an example in which three solar cell panels 10 of the solar cell panel 10a, the solar cell panel 10b, and the solar cell panel 10c are provided is described in the present embodiment, the present invention is not limited thereto. For example, one or two solar cell panels 10 may be provided, or four or more solar cell panels 10 may be provided.

Further, a solar cell sensor unit (illustrated as PVS in FIG. 1) 11 is provided so as to correspond to each solar cell panel 10. The solar cell sensor unit 11 detects an output of the corresponding solar cell panel 10, and sends a detection signal containing both a detection result and an identifier (that is, ID) of the solar cell sensor unit 11 to the solar power generation control unit 30. The solar cell sensor unit 11 detects an output voltage or an output current of the solar cell panel 10 as an output of the solar cell panel 10. Accordingly, the solar power generation control unit 30 (for example, a solar power generation control device 32) can acquire information indicating the output voltage or the output current for each solar cell panel 10 based on the detection signal from each solar cell unit 11.

The solar power generation control unit 30 includes an electric power adjustment device 31 and the solar power generation control device 32. A plurality of electric power adjustment devices 31 are provided so as to correspond to the respective solar cell panels 10. Specifically, in the present embodiment, an electric power adjustment device 31a is provided corresponding to the solar cell panel 10a. An electric power adjustment device 31b is provided corresponding to the solar cell panel 10b. An electric power adjustment device 31c is provided corresponding to the solar cell panel 10c.

Each electric power adjustment device 31 receives electric power generated by the corresponding solar cell panel 10, and outputs the received electric power to the charging control device 40. The electric power adjustment device 31 may directly output the electric power generated by the corresponding solar cell panel 10 to the charging control device 40, or may output the electric power to the charging control device 40 via another electric power adjustment device 31.

Each electric power adjustment device 31 controls the electric power generated by the corresponding solar cell panel 10. Specifically, each electric power adjustment device 31 performs maximum power point tracking control (hereinafter, also referred to as MPPT control) so that the electric power generated by the corresponding solar cell panel 10 is maximized. The electric power adjustment device 31 can be implemented with a so-called micro-converter having a function of performing MPPT control, for example.

The solar power generation control device 32 is an example of the solar power generation control device of the present invention. The solar power generation control device 32 predicts a change in a solar radiation state of the vehicle 1 based on information received from an image-capturing device 5, a communication device 6, a navigation device 7, and the like, which will be described later, and controls an operation mode of the solar power generation system 2.

Here, the solar radiation state of the vehicle 1 is a state of irradiation light (for example, sunlight) radiated to the vehicle 1. For example, the solar radiation state of the vehicle 1 includes intensity of sunlight radiated to the vehicle 1 (hereinafter also referred to as solar radiation intensity). The solar radiation state of the vehicle 1 may include intensity (height) of scattered light component of the sunlight radiated to the vehicle 1, intensity of reflected light radiated to the vehicle 1, and the like.

In the present embodiment, as the operation mode, the solar power generation system 2 may adopt a startup mode and a pause mode (sleep mode) in which power consumption of the solar power generation system 2 is less than in the startup mode. Specifically, the startup mode is an operation mode in which the battery 50 is charged with the electric power generated by the solar cell panel 10. On the other hand, the pause mode is an operation mode in which the battery 50 is not charged with the electric power generated by the solar cell panel 10.

For example, in the pause mode, the electric power adjustment device 31 disables other functions (for example, a function of performing MPPT control) except a function of communication with the solar power generation control device 32. Accordingly, since power consumption of the electric power adjustment device 31 is reduced in the pause mode, power consumption of the entire solar power generation system 2 is reduced. Further, in the pause mode, not only the electric power adjustment device 31 but also other components (for example, the charging control device 40) may disable a function serving for charging the battery 50 as appropriate. A configuration example of the solar power generation control device 32 will be described later with reference to FIG. 3.

The charging control device 40 receives the electric power generated by the solar cell panel 10 via the solar power generation control unit 30, and charges the battery 50 with the received electric power. The battery 50 is an example of a power storage device in the present invention, and is configured with a plurality of battery modules 51 connected in series. Each of the plurality of battery modules 51 is connected to the charging control device 40, and the charging control device 40 can selectively charge each of the battery modules 51.

For example, the charging control device 40 distributes electric power to the battery modules 51 and charges the battery modules 51 so that remaining capacities of the battery modules 51 are equal. The charging control device 40 can be implemented with a predetermined integrated circuit, for example. The electric power of the battery 50 is supplied to the traction motor 3 via an electric power conversion device 4 that converts a direct current into an alternating current. The electric power conversion device 4 can be implemented with an inverter device, for example.

The vehicle 1 includes the image-capturing device 5 that captures an image of surroundings of the vehicle 1, the communication device 6 that communicates with an external device of the vehicle 1, and the navigation device 7. The image-capturing device 5 is, for example, a digital camera that captures an image of the front side of the vehicle 1, and outputs image data representing the captured image to the solar power generation control device 32.

The communication device 6 is communicably connected to an external device via a wireless communication network such as a mobile communication network, a Wi-Fi network, Bluetooth (registered trademark), or dedicated short range communication (DSRC). The communication device 6 is connected to the solar power generation control device 32, outputs information received from the external device to the solar power generation control device 32, and communicates with the external device based on information received from the solar power generation control device 32.

The navigation device 7 is a so-called car navigation system. The navigation device 7 identifies a location of the vehicle 1 by, for example, a global navigation satellite system (GNSS), and performs route guidance to a destination based on the identified location of the vehicle 1 and map information stored in advance. The navigation device 7 includes a display device capable of displaying various types of information, an operation part that receives an input operation of the user, and the like. The navigation device 7 is connected to the solar power generation control device 32, outputs location information indicating the identified location of the vehicle 1 and date and time information indicating date and time to the solar power generation control device 32, and controls display content of the display device based on information received from the solar power generation control device 32.

Figure 2:
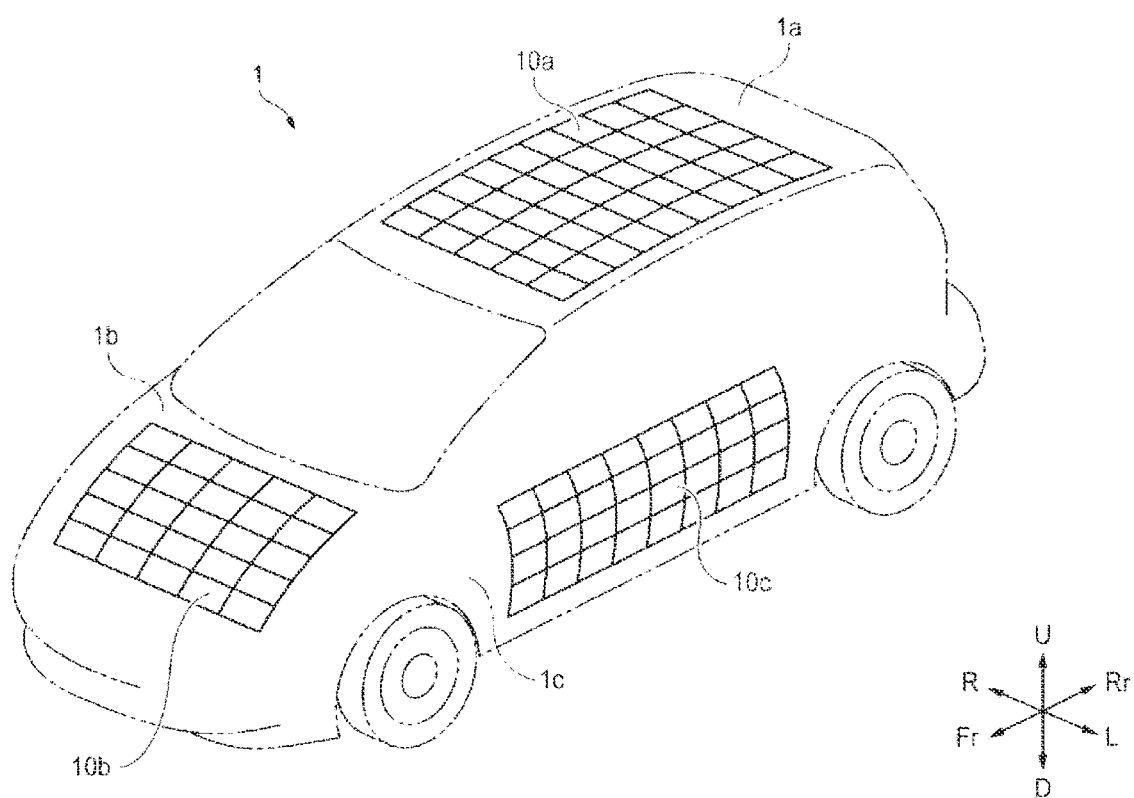
FIG. 2 is a diagram illustrating an example of an arrangement position of each solar cell panel.

Next, an example of an arrangement position of each solar cell panel 10 will be described with reference to FIG. 2. As illustrated in FIG. 2, the solar cell panel 10a is arranged at a roof portion 1a of the vehicle 1 in a state where a light receiving portion thereof capable of receiving the irradiation light faces upward. The solar cell panel 10b is arranged at a hood portion 1b of the vehicle 1 in a state where a light receiving portion thereof capable of receiving the irradiation light faces upward. The solar cell panel 10c is arranged at a left side portion 1c (for example, a left side door) of the vehicle 1 in a state where a light receiving portion thereof capable of receiving the irradiation light faces leftward.

In this manner, the solar cell panel 10a, the solar cell panel 10b, and the solar cell panel 10c are arranged at different positions of the vehicle 1. In particular, the solar cell panel 10a is arranged on an upper side of the solar cell panel 10b and the solar cell panel 10c. As described above, in the solar power generation system 2, four or more solar cell panels 10 may be provided, and, for example, similarly to the left side portion 1c of the vehicle 1, a right side portion (for example, a right side door) of the vehicle 1 may be provided with the solar cell panel 10.

Figure 3:
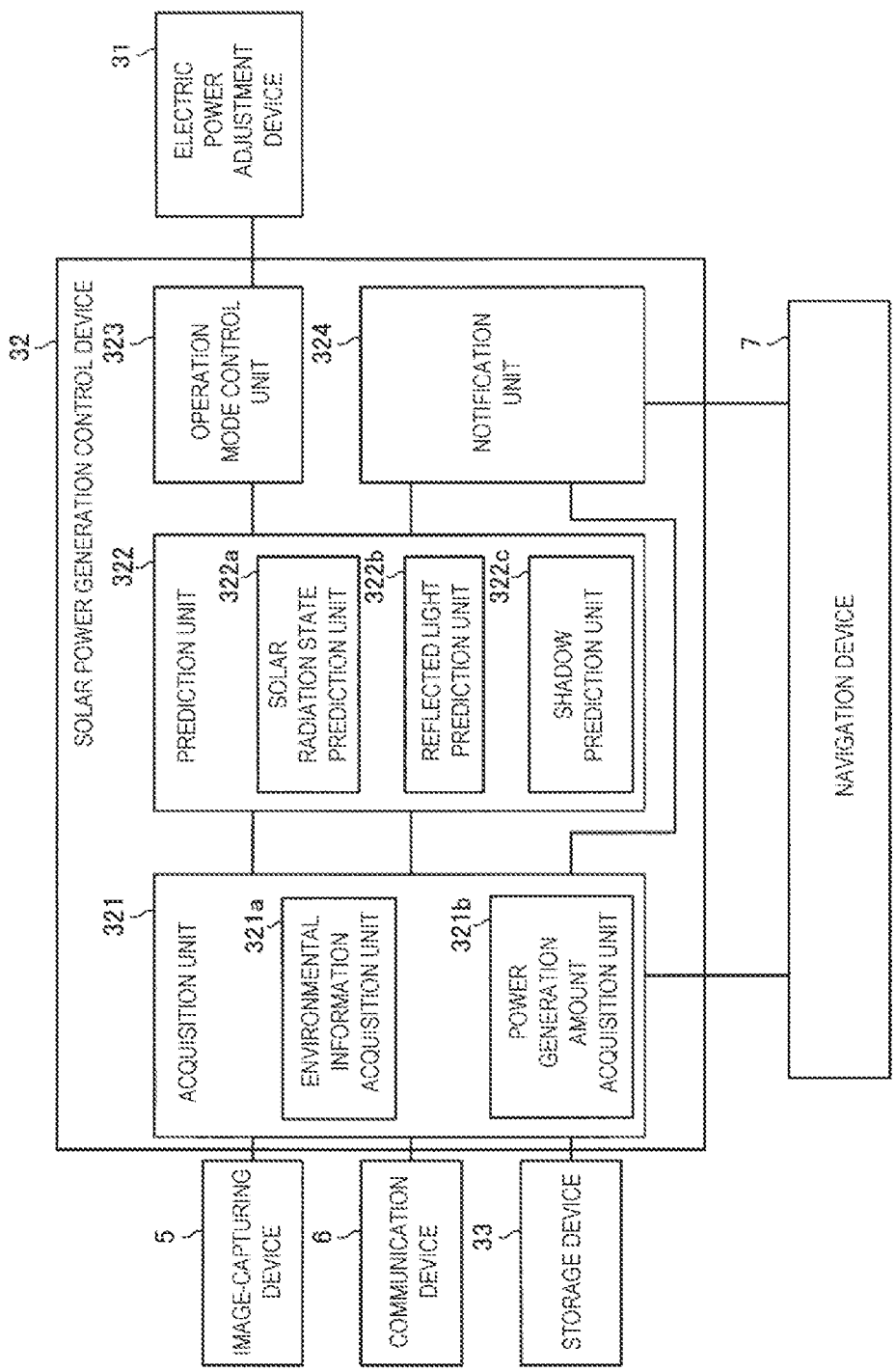
FIG. 3 is a block diagram illustrating a functional configuration example of the solar power generation control device of the present embodiment.

Next, an example of a functional configuration of the solar power generation control device 32 will be described with reference to FIG. 3. As illustrated in FIG. 3, the solar power generation control device 32 includes an acquisition unit 321, a prediction unit 322, an operation mode control unit 323, and a notification unit 324.

The acquisition unit 321 acquires various types of information necessary for control of the solar power generation system 2. Specifically, the acquisition unit 321 includes an environmental information acquisition unit 321a. The environmental information acquisition unit 321a acquires environmental information on weather or a planimetric feature around the vehicle 1. In the present embodiment, an example in which both information on weather and information on a planimetric feature is included in the environmental information will be described.

First, information on weather will be described. Here, the information on weather includes information on a cloud. The information on a cloud is, for example, information indicating a type of a cloud around the vehicle 1 (for example, in the air in front of the vehicle 1).

With respect to the cloud type, a cloud is roughly classified into three types of a high-level cloud, a middle-level cloud, and a low-level cloud. Further, the high-level cloud is divided into a cirrus, a cirrocumulus and a cirrostratus. When a high-level cloud appears, the sunlight is scattered due to the high-level cloud, and the scattered light component that reaches the ground is increased as compared with that in a case where there is no high-level cloud (for example, in a case of a cloudless weather). The middle-level cloud is divided into an altocumulus, an altostratus, and a nimbostratus. The low-level cloud is divided into a stratocumulus, a cumulus, a stratus, and a cumulonimbus.

The information on a cloud indicates, for example, whether a cloud around the vehicle 1 is a high-level cloud. The environmental information acquisition unit 321a can acquire the information on a cloud indicating whether the cloud around the vehicle 1 is a high-level cloud, by performing image-analysis on a captured image captured by the image-capturing device 5 based on master data defining characteristics of the high-level cloud (that is identifying the high-level cloud). That is, when an image having the characteristics of the high-level cloud defined by the master data is included in the captured image captured by the image-capturing device 5, the environmental information acquisition unit 321a acquires information on a cloud indicating that the cloud around the vehicle 1 is a high-level cloud. Accordingly, even if the information on a cloud is not acquired from an external device of the vehicle 1, the information on a cloud can be acquired by the device itself.

For example, master data defining characteristics of each type of cloud may be prepared, and the environmental information acquisition unit 321a may refer to the master data to check which type of cloud the cloud included in the captured image captured by the image-capturing device 5 is. In this way, the environmental information acquisition unit 321a can acquire the information on a cloud indicating which type of cloud the cloud around the vehicle 1 is, not limited to the high-level cloud.

The environmental information acquisition unit 321a may acquire environmental information including information on weather (for example, information on a cloud) from another external device via the communication device 6. Here, the other device is a server or the like that can communicate with the communication device 6, and is, for example, a weather information server that distributes weather information. The environmental information acquisition unit 321a may acquire the environmental information including the information on a cloud from a vehicle information and communication system (VICS), intelligent transport systems (ITS), another vehicle around the vehicle 1 (for example, a preceding vehicle), or the like via the communication device 6. In addition to the information on a cloud, the information on weather may include, for example, information indicating weather (for example, fine weather), an air temperature, humidity, an atmospheric pressure, a wind speed, and the like.

Next, the information on a planimetric feature will be described. Here, the information on a planimetric feature includes information indicating a location (for example, latitude and longitude), a size, a color, and the like of a planimetric feature that can generate a shadow in the sunlight. The planimetric feature that can generate a shadow in the sunlight is, for example, a structure such as a building, a tunnel and a steel bridge, or a natural object such as a tree. The planimetric feature that can generate a shadow in the sunlight may be another vehicle around the vehicle 1 (for example, another vehicle parked or stopped around the vehicle 1).

The environmental information acquisition unit 321a can acquire the environmental information including information on a planimetric feature by referring to map information having information indicating a location, a size, and a color of each planimetric feature, for example. The map information may be stored in advance in a storage device 33 (for example, flash memory) of the vehicle 1, or may be acquired from another device (for example, a map server) via the communication device 6. The environmental information acquisition unit 321*a* may acquire the environmental information including information on a planimetric feature by performing image analysis on a captured image captured by the image-capturing device 5.

The acquisition unit 321 may appropriately acquire location information indicating a location of the vehicle 1, date and time information indicating date and time, and the like in addition to the environmental information. The location information and the date and time information can be acquired from the navigation device 7, for example.

The prediction unit 322 performs various types of prediction using the information acquired by the acquisition unit 321. Specifically, the prediction unit 322 includes a solar radiation state prediction unit 322*a*. The solar radiation state prediction unit 322*a* predicts a change in the solar radiation state of the vehicle 1 based on the environmental information acquired by the environmental information acquisition unit 321*a* and a moving state of the vehicle 1. Here, the moving state of the vehicle 1 includes, for example, a location of the vehicle 1, a running direction, a speed (including a speed "0", that is, a parked or stopped state), a running road, and the like.

Specifically, the solar radiation state prediction unit 322*a* predicts a change in the solar radiation state based on the information on a planimetric feature in the environmental information, or predicts a change in the solar radiation state based on the information on weather in the environmental information.

First, an example in which a change in the solar radiation state is predicted based on the information on a planimetric feature will be described. When there is a predetermined planimetric feature ahead in a running direction of the vehicle 1, the solar radiation state prediction unit 322*a* predicts that the solar radiation state of the vehicle 1 will deteriorate. More specifically, when there is a tunnel in a scheduled running route of the vehicle 1, the solar radiation state prediction unit 322*a* predicts that the solar radiation state of the vehicle 1 will deteriorate.

Here, the scheduled running route of the vehicle 1 may be, for example, a road on which the vehicle 1 is running, and more specifically, may be a part of the road ahead in the running direction of the vehicle 1. That is, when the vehicle 1 is running in the tunnel, a low illuminance state in which a solar radiation intensity to the vehicle 1 (that is, the solar cell panel 10) is substantially "O" continues. Therefore, when there is a tunnel in the scheduled running route of the vehicle 1, the solar radiation state prediction unit 322*a* predicts that the solar radiation state of the vehicle 1 will deteriorate.

Further, for example, when a huge structure (for example, a building) such as a high-rise building is present in the vicinity of the scheduled running route of the vehicle 1, there is a possibility that the solar radiation state of the vehicle 1 deteriorates due to a shadow generated by the structure. Therefore, when there is a huge structure such as a high-rise building in the vicinity of the scheduled running route of the vehicle 1, the solar radiation state prediction unit 322*a* may predict that the solar radiation state of the vehicle 1 will deteriorate.

Further, for example, when the vehicle 1 is running on a tree-lined road or a steel bridge, a state in which the solar radiation intensity to the vehicle 1 is high (that is, sunlight-exposed) and a state in which the solar radiation intensity to the vehicle 1 is low (that is, shaded) are periodically repeated. Therefore, when there is a street tree or a steel bridge in the scheduled running route of the vehicle 1, the solar radiation state prediction unit 322*a* may predict that the solar radiation state of the vehicle 1 will deteriorate.

Further, for example, when another vehicle is parked or stopped at the side of the scheduled running route of the vehicle 1, the solar radiation state of the vehicle 1 may deteriorate due to a shadow generated by the other vehicle. Therefore, when there is another vehicle parked or stopped at the side of the scheduled running route of the vehicle 1, the solar radiation state prediction unit 322*a* may predict that the solar radiation state of the vehicle 1 will deteriorate.

A shadow generated by a planimetric feature is determined based on a size and a location of the planimetric feature and a position of the sun. Therefore, it is desirable to consider the shadow generated by the planimetric feature, which is predicted based on the size and the location of the planimetric feature and the position of the sun identified according to a season and a time point, before using the solar radiation state prediction unit 322*a* to determine the influence (for example, whether the solar radiation state deteriorates) of the planimetric feature on the solar radiation state of the vehicle 1. In this way, it is possible to accurately determine the influence of the planimetric feature on the solar radiation state of the vehicle 1.

Next, an example in which a change in the solar radiation state is predicted based on the information on weather will be described. The solar radiation state prediction unit 322*a* predicts a change in the solar radiation state of the vehicle 1 based on, for example, a cloud around the vehicle 1. Accordingly, it is possible to control the operation mode of the solar power generation system 2 based on a cloud that greatly affects the solar radiation state of the vehicle 1.

More specifically, when a cloud around the vehicle 1 is a high-level cloud, the solar radiation state prediction unit 322*a* predicts that the solar radiation state of the vehicle 1 will turn better. As described above, when a high-level cloud appears, the scattered light component of the sunlight increases. Therefore, when the cloud around the vehicle 1 is a high-level cloud, the solar radiation state prediction unit 322*a* predicts that the solar radiation state of the vehicle 1 will turn better (the scattered light component of the sunlight increases). Accordingly, in a condition where the cloud around the vehicle 1 is a high-level cloud and an increase of the scattered light component of the sunlight radiated to the vehicle 1 can be predicted, it is possible to set the solar power generation system 2 to a startup mode and charge the battery 50 with the electric power generated by the solar cell panel 10.

The solar radiation state prediction unit 322*a* may predict a future change in the solar radiation state of the vehicle 1 when the vehicle 1 is stopped at a predetermined location. In this case, based on a size and a location of a planimetric feature around the predetermined location and a future position of the sun, the solar radiation state prediction unit 322*a* may predict a shadow generated by the planimetric feature in the future at the predetermined location, and predict a future change in the solar radiation state of the vehicle 1 based on the predicted shadow. Accordingly, for example, the solar radiation state prediction unit 322*a* can predict at which position in a parking lot when the vehicle 1 is stopped the solar radiation state will turn better (that is, at which position it is better to stop the vehicle 1 considering power generation amount of the solar cell panel 10).

The operation mode control unit 323 controls the operation mode of the solar power generation system 2 based on a prediction result of the solar radiation state prediction unit 322*a*. For example, in a case where the solar radiation state prediction unit 322*a* predicts that the solar radiation state of the vehicle 1 will turn better while the solar power generation system 2 is in the pause mode, the operation mode control unit 323 sets the solar power generation system 2 to the startup mode.

On the other hand, in a case where the solar radiation state prediction unit 322a does not predict that the solar radiation state of the vehicle 1 will turn better while the solar power generation system 2 is in the pause mode, the operation mode control unit 323 maintains the solar power generation system 2 in the pause mode as it is. Note that the operation mode control unit 323 may control the operation mode of the solar power generation system 2 by controlling the electric power adjustment device 31 as described above, for example.

If the solar power generation system 2 is set to the startup mode after detecting that the solar radiation state of the vehicle 1 actually turns better, a time lag may occur from when the solar radiation state of the vehicle 1 actually turns better to when the solar power generation system 2 enters the startup mode. Therefore, even in a condition where the battery 50 can be charged with the electric power generated by the solar cell panel 10, it may occur that the battery 50 cannot be charged since the solar power generation system 2 is not in the startup mode.

In contrast, since the solar power generation control device 32 sets the solar power generation system 2 to the startup mode when the solar radiation state prediction unit 322a predicts that the solar radiation state of the vehicle 1 will turn better, the solar power generation system 2 can be set to the startup mode before the solar radiation state of the vehicle 1 actually turns better, and the opportunity of charging the battery 50 with the electric power generated by the solar cell panel 10 can be increased.

When it is not predicted that the solar radiation state of the vehicle 1 will turn better, the solar power generation control device 32 maintains the solar power generation system 2 in the pause mode as it is. Therefore, in a condition where charging of the battery 50 with the electric power generated by the solar cell panel 10 cannot be expected, the solar power generation control device 32 can prevent an occurrence that the solar power generation system 2 is set to the startup mode resulting in an increase in the power consumption of the solar power generation system 2. As described above, the solar power generation control device 32 can efficiently charge the battery 50 with the electric power generated by the solar cell panel 10 while reducing the power consumption of the solar power generation system 2.

The prediction unit 322 includes a reflected light prediction unit 322b. The reflected light prediction unit 322b predicts a location where reflected light reflected by a planimetric feature is to be applied, based on the information on a planimetric feature included in the environmental information and a position of the sun. Here, the reflected light is, for example, sunlight reflected by a planimetric feature. The reflected light prediction unit 322b predicts the location where the reflected light reflected by the planimetric feature is to be applied, based on, for example, a position of the sun identified according to a season and a time point, and a size, a location, a color, and the like of the planimetric feature.

The notification unit 324 performs notification based on a prediction result of the prediction unit 322. For example, the notification unit 324 notifies the user of the vehicle 1 of the location where the reflected light is to be applied that is predicted by the reflected light prediction unit 322b. Accordingly, a location where the power generation amount of the solar cell panel 10 is expected to increase can be presented to the user. The notification unit 324 notifies the user of the vehicle 1, for example, by displaying the location where the reflected light is to be applied on a display device (for example, a liquid crystal display) of the navigation device 7. More specifically, the notification unit 324 can notify the user of the location, where the reflected light is to be applied, in an easily understandable way by highlighting the location on a map displayed by the display device of the navigation device 7.

Further, the notification unit 324 may notify the user of the vehicle 1 of a location, where the reflected light is to be applied, around the vehicle 1 (for example, within a predetermined range around a current location of the vehicle 1). Accordingly, the user of the vehicle 1 can know the location at which the reflected light is to be applied and which is near in distance (that is, easy to go), and thus convenience for the user can be improved. Further, the notification unit 324 may notify the user of the vehicle 1 of a route including the location around the vehicle 1 where the reflected light is to be applied. Accordingly, a route on which the power generation amount of the solar cell panel 10 can be expected to increase can be presented to the user.

The prediction unit 322 includes a shadow prediction unit 322c. The shadow prediction unit 322c predicts a shadow generated by a planimetric feature based on the information on a planimetric feature included in the environmental information and a position of the sun. The shadow prediction unit 322c predicts a shadow generated in the future by the planimetric feature based on, for example, a position of the sun identified according to a season and a time point, and a size, a location, and the like of the planimetric feature. The shadow prediction unit 322c predicts a shadow generated in a predetermined time period in the future by the planimetric feature, for example.

Then, for example, the notification unit 324 notifies the user of the vehicle 1 of a location not included in the shadow that is generated by the planimetric feature and that is predicted by the shadow prediction unit 322c (that is, a location that is not shaded). Thus, a location where a decrease in the power generation amount of the solar cell panel 10 can be prevented can be presented to the user. The notification unit 324 notifies the user of the vehicle 1 of the location that is not shaded, for example, by displaying the location that is not shaded on the display device of the navigation device 7. More specifically, the notification unit 324 can notify the user of the location that is not shaded in an easily understandable way by highlighting the location on a map displayed by the display device of the navigation device 7.

Further, the notification unit 324 may notify the user of the vehicle 1 of a location that is not shaded around the vehicle 1 (for example, within a predetermined range around a current location of the vehicle 1). Accordingly, the user of the vehicle 1 can know the location that is not shaded and that is near in distance (that is, easy to go), and thus convenience for the user can be improved. Further, the notification unit 324 may notify the user of the vehicle 1 of a route including the location that is not shaded around the vehicle 1. Thus, a route where a decrease in the power generation amount of the solar cell panel 10 can be prevented can be presented to the user.

The acquisition unit 321 includes a power generation amount acquisition unit 321b. The power generation amount acquisition unit 321b acquires information indicating an amount of electric power predicted to be generated by the solar cell panel 10 when the vehicle 1 runs along a predetermined route (hereinafter, also referred to as a predicted power generation amount). Here, the predetermined route is, for example, a route along which the vehicle 1 has ran.

Specifically, the solar power generation control device 32 sets the solar power generation system 2 to the startup mode on a route on which the vehicle 1 runs for the first time, and measures the amount of electric power generated by the solar cell panel 10 when the vehicle 1 runs on the route. Then, the solar power generation control device 32 stores information indicating the measured amount of electric power in the storage device 33 as information indicating a predicted power generation amount in a case of running on this route in the future. Thus, the power generation amount acquisition unit 321*b* can acquire information indicating the predicted power generation amount from the storage device 33. The solar power generation control device 32 may measure, for each route for a plurality of times, the amount of electric power generated by the solar cell panel 10 when the vehicle 1 runs on the route, and store an average value or a median value in the storage device 33 as the information indicating the predicted power generation amount in a case of running on the route in the future.

When there are a plurality of routes connecting two fixed places, the power generation amount acquisition unit 321*b* acquires information indicating a predicted power generation amount of each route. Here, for example, one of the two fixed places is a place where the vehicle 1 is located. The other place of the two fixed places is, for example, a place on the scheduled running route of the vehicle 1, and more specifically, a place predicted as a destination or a waypoint of the vehicle 1.

When the information indicating the predicted power generation amount of the plurality of routes is acquired by the power generation amount acquisition unit 321*b*, the notification unit 324 notifies a route having the largest predicted power generation amount among the plurality of routes. Accordingly, it is possible to present the user a route predicted as having the largest power generation amount of the solar cell panel 10. The notification unit 324 notifies the user of the vehicle 1 of the route having the largest predicted power generation amount, for example, by displaying the route on the display device of the navigation device 7. More specifically, the notification unit 324 can notify the user of the route having the largest predicted power generation amount in an easily understandable way by highlighting the route on a map displayed by the display device of the navigation device 7. The notification unit 324 may instruct the navigation device 7 to perform route presentation (guidance) of the route having the largest predicted power generation amount.

Each of functional parts of the solar power generation control device 32 described above can be implemented by, for example, a central processing unit (CPU) executing a predetermined program (software). A part or all of the functional parts of the solar power generation control device 32 may be implemented with hardware such as large scale integration (LSI), an application specific integrated circuit (ASIC), a field-programmable gate array (FPGA), or a graphics processing unit (GPU), or may be implemented by cooperation of software and hardware.

Figure 4:
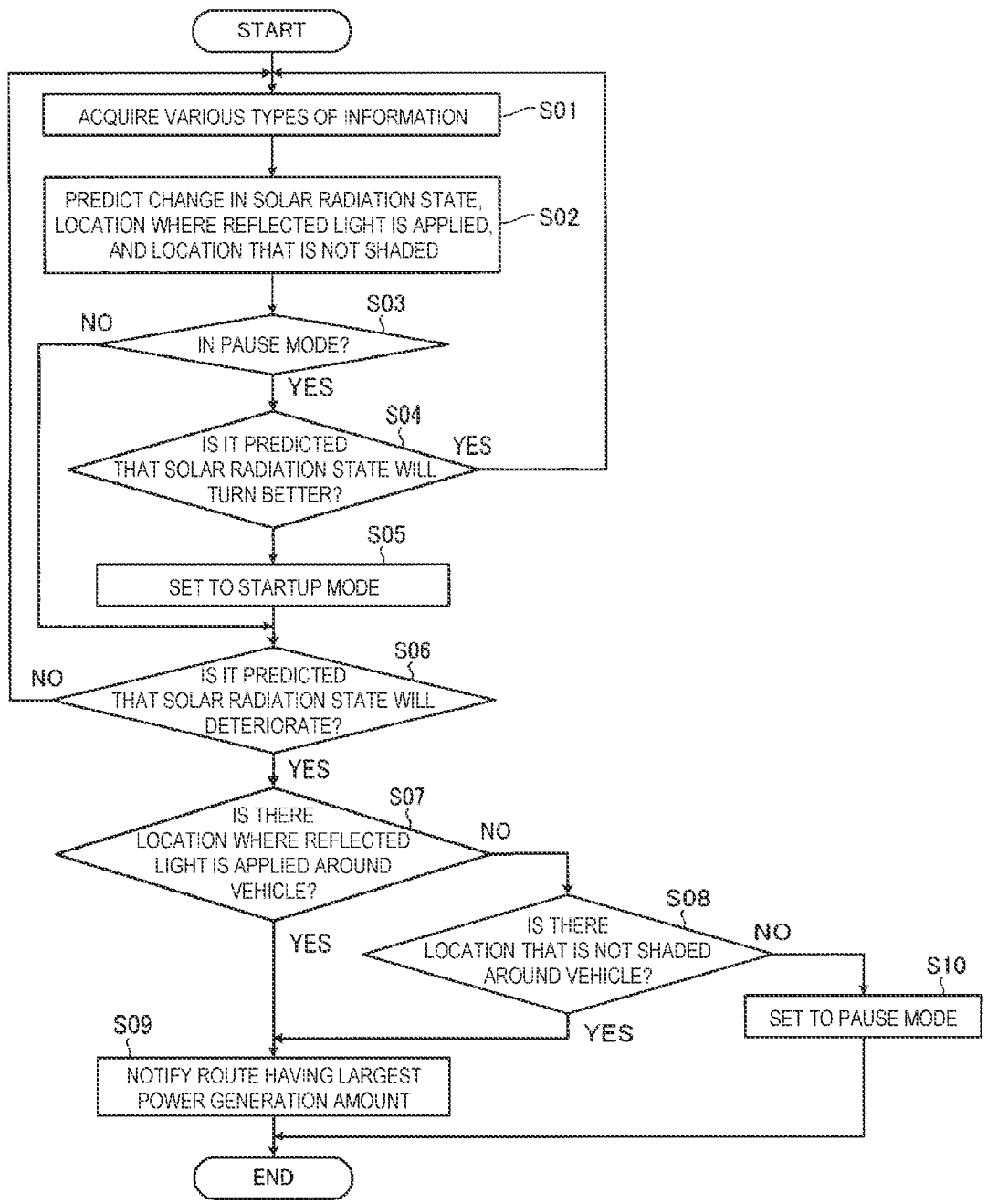
FIG. 4 is a flowchart illustrating an example of control processing performed by the solar power generation control device of the present embodiment.

Next, an example of control processing of the solar power generation system 2 performed by the solar power generation control device 32 will be described with reference to FIG. 4. The solar power generation control device 32, for example, performs the control processing illustrated in FIG. 4 at a predetermined cycle. As illustrated in FIG. 4, first, the solar power generation control device 32 acquires various types of information necessary for control of the solar power generation system 2 (step S01). In step S01, the solar power generation control device 32 acquires, for example, environmental information, location information of the vehicle 1, date and time information, and the like.

Next, the solar power generation control device 32 predicts a solar radiation state of the vehicle 1, a location where reflected light is applied, and a location that is not shaded (step S02). Then, the solar power generation control device 32 determines whether an operation mode of the solar power generation system 2 is the pause mode (step S03). When the operation mode of the solar power generation system 2 is not the pause mode (NO in step S03), that is, when the operation mode of the solar power generation system 2 is the startup mode, the solar power generation control device 32 shifts the process to processing of step S06.

When the operation mode of the solar power generation system 2 is the pause mode (YES in step S03), the solar power generation control device 32 determines whether it is predicted according to the processing of step S02 that the solar radiation state of the vehicle 1 will turn better (step S04). When it is not predicted that the solar radiation state of the vehicle 1 will turn better (NO in step S04), the solar power generation control device 32 shifts the process to the processing of step S01. On the other hand, when it is predicted that the solar radiation state of the vehicle 1 will turn better (YES in step S04), the solar power generation control device 32 sets the operation mode of the solar power generation system 2 to the startup mode (step S05).

Next, the solar power generation control device 32 determines whether it is predicted according to the processing of step S02 that the solar radiation state of the vehicle 1 will deteriorate (step S06). If it is not predicted that the solar radiation state of the vehicle 1 will deteriorate (NO in step S06), the solar power generation control device 32 shifts the process to the processing of step S01. On the other hand, when it is predicted that the solar radiation state of the vehicle 1 will deteriorate (YES in step S06), the solar power generation control device 32 determines whether there is a location around the vehicle 1 where reflected light is applied based on a processing result of step S02 (step S07). When there is a location around the vehicle 1 where reflected light is applied (YES in step S07), the solar power generation control device 32 shifts the process to processing of step S09.

When there is no location around the vehicle 1 where reflected light is applied (NO in step S07), the solar power generation control device 32 determines whether there is a location that is not shaded around the vehicle 1 based on the processing result of step S02 (step S08). When there is a location that is not shaded around the vehicle 1 (YES in step S08), the solar power generation control device 32 shifts the process to the processing of step S09.

Next, the solar power generation control device 32 searches for a route having the largest power generation amount, notifies the route having the largest power generation amount (step S09), and ends the processing. For example, when it is determined in step S07 that there is a location around the vehicle 1 where reflected light is applied, the solar power generation control device 32 notifies in step S09 a route having the largest predicted power generation amount and including the location where reflected light is applied, among routes from a location where the vehicle 1 is located to a location predicted as a destination or a waypoint of the vehicle 1.

The influence of direct light and scattered light on the solar radiation state of the vehicle 1 when running on each route may be taken into consideration in acquiring the predicted power generation amount by the solar power generation control device 32. In this case, the predicted power generation amount obtained after considering the direct light and the scattered light when running on each route may be stored in advance; a mathematical expression, a table, a pattern, or the like allowing derivation of the predicted power generation amount obtained after considering the direct light and the scattered light may be prepared, and be used to derive the predicted power generation amount obtained after considering the direct light and the scattered light.

For example, when it is determined in step S08 that there is a location that is not shaded around the vehicle 1, the solar power generation control device 32 notifies in step S09 a route having the largest predicted power generation amount and including the location that is not shaded, among the routes from a location where the vehicle 1 is located to a location predicted as a destination or a waypoint of the vehicle 1.

On the other hand, when there is no location that is not shaded around the vehicle 1 (NO in step S08), the solar power generation control device 32 sets the operation mode of the solar power generation system 2 to the pause mode (step S10), and ends the control processing illustrated in FIG. 4.

As described above, according to the solar power generation control device 32, it is possible to increase the opportunity of charging the battery 50 with the electric power generated by the solar cell panel 10.

In the example described above, the solar power generation system 2 is set to the startup mode when the type of the cloud around the vehicle 1 is the high-level cloud, but the present invention is not limited thereto. Even when the type of the cloud around the vehicle 1 is other than the high-level cloud, the solar power generation system 2 may be set to the startup mode in consideration of the type of the cloud and a distance to the cloud. A specific example of this case will be described below with reference to FIG. 5.

In FIG. 5, a control table Ta stores information in which a cloud type, a distance condition, and an operation mode of the solar power generation system 2 are associated with each other. The control table Ta is stored in advance in the storage device 33, for example.

In this case, master data defining characteristics of each type of cloud is prepared, and the solar power generation control device 32 identifies which type a cloud included in a captured image captured by the image-capturing device 5 is. Then, the solar power generation control device 32 refers to the control table Ta, and determines whether to set the solar power generation system 2 to the startup mode according to the identified type of cloud.

For example, when the cloud is an altocumulus included in the middle-level cloud, an increase in the scattered light component can be expected similarly to the case of the high-level cloud. Therefore, as illustrated in FIG. 5, in the control table Ta, an operation mode corresponding to the altocumulus is set to a startup mode. Accordingly, the solar power generation control device 32 can set the solar power generation system 2 to the startup mode when the identified type of cloud is the altocumulus.

In addition, for example, even when the cloud is a stratocumulus cloud included in the low-level cloud and the vehicle is away from the stratocumulus by a predetermined distance or more, an increase in the scattered light component can be expected similarly to the case of the high-level cloud. Therefore, as illustrated in FIG. 5, in the control table Ta, an operation mode corresponding to the stratocumulus and a distance condition of "predetermined distance or more" is set as a startup mode. Accordingly, the solar power generation control device 32 can set the solar power generation system 2 to the startup mode when the identified type of cloud is the stratocumulus and a distance from the vehicle 1 to the stratocumulus is the predetermined distance or more. The distance to the cloud may be determined based on a focal length at the time of capturing an image by the image-capturing device 5 or the like, or may be determined based on a location of the vehicle 1 and information (for example, information on a cloud) obtained from an external device such as a weather information server.

The present invention is not limited to the embodiment described above, and modifications, improvements, or the like can be made as appropriate.

For example, in the embodiment described above, the vehicle 1 is described as an electric vehicle, and alternatively the vehicle 1 may be a hybrid electric vehicle or a fuel-cell vehicle (fuel vehicle).

In the embodiment described above, the image-capturing device 5, the communication device 6, and the navigation device 7 directly output various types of information to the solar power generation control device 32, but the present invention is not limited thereto. For example, the image-capturing device 5, the communication device 6, and the navigation device 7 may directly output various types of information to the solar power generation control device 32 via a predetermined control device provided in the vehicle 1. Similarly, the solar power generation control device 32 may output various types of information to the communication device 6 and the navigation device 7 via a predetermined control device provided in the vehicle 1.

At least the following matters are described in the present description. Components and the like corresponding to the above-described embodiment are shown in parentheses, but the present invention is not limited thereto.

(1) A solar power generation control device (solar power generation control device 32) that controls a solar power generation system (solar power generation system 2) capable of charging a power storage device (battery 50) of a vehicle with electric power generated by a solar cell (solar cell panel 10) provided in the vehicle, an operation mode of the solar power generation system including:

a first mode (startup mode) in which the power storage device is charged with electric power generated by the solar cell; and a second mode (pause mode) in which power consumption of the solar power generation system is lower than in the first mode, the solar power generation control device including:

an acquisition unit (acquisition unit 321, environmental information acquisition unit 321a) that acquires environmental information on weather or a planimetric feature around the vehicle;

a prediction unit (prediction unit 322, solar radiation state prediction unit 322a) that predicts a change in solar radiation state of the vehicle based on the environmental information acquired by the acquisition unit and a moving state of the vehicle, and a control unit (operation mode control unit 323) that controls the operation mode of the solar power generation system based on a prediction result of the prediction unit.

According to (1), since the change in the solar radiation state of the vehicle is predicted based on the environmental information on weather or a planimetric feature around the vehicle and the moving state of the vehicle, and the operation mode of the solar power generation system is controlled based on the prediction result, the solar power generation system can be set to the first mode before the solar radiation state of the vehicle actually changes, and the opportunity of charging the power storage device with the electric power generated by the solar cell can be increased.

(2) The solar power generation control device according to (1), in which the environmental information includes information on a cloud, and in which the prediction unit predicts a change in the solar radiation state of the vehicle based on a cloud around the vehicle.

According to (2), since the change in the solar radiation state of the vehicle is predicted based on a cloud around the vehicle, the operation mode of the solar power generation system can be controlled based on a cloud that greatly affects the solar radiation state, and the power storage device can be efficiently charged with the electric power generated by the solar cell.

(3) The solar power generation control device according to (2), in which when the cloud around the vehicle is a high-level cloud, the prediction unit predicts that the solar radiation state of the vehicle will turn better, and in which when the prediction unit predicts that the solar radiation state of the vehicle will turn better, the control unit sets the solar power generation system to the first mode.

According to (3), when the cloud around the vehicle is a high-level cloud, it is predicted that the solar radiation state of the vehicle will turn better, and when it is predicted that the solar radiation state of the vehicle will turn better, the solar power generation system is set to the first mode. Accordingly, in a condition where the cloud around the vehicle is a high-level cloud and an increase in a scattered light component of the sunlight irradiated to the vehicle can be expected, the solar power generation system can be set to the first mode, and the power storage device can be charged efficiently with the electric power generated by the solar cell.

(4) The solar power generation control device according to (3), in which the acquisition unit performs image analysis on a captured image captured by an image-capturing device (image-capturing device 5), which captures an image of surroundings of the vehicle, based on master data defining a characteristic of the high-level cloud, and acquires the information on a cloud indicating that the cloud around the vehicle is the high-level cloud when an image having the characteristic of the high-level cloud defined by the master data is included in the captured image.

According to (4), image analysis is performed on the captured image captured by the image-capturing device, which captures an image of surroundings of the vehicle, based on the master data defining a characteristic of the high-level cloud, and when an image having the characteristic of the high-level cloud defined by the master data is included in the captured image, the information on a cloud indicating that the cloud around the vehicle is the high-level cloud is acquired. Accordingly, it is possible to acquire information on a cloud indicating that the cloud around the vehicle is a high-level cloud, without acquiring the information on a cloud from an external device.

(5) The solar power generation control device according to any one of (1) to (4), the environmental information including information on the planimetric feature, the solar power generation control device further including: a reflected light prediction unit (reflected light prediction unit 322*b*) that predicts a location where reflected light reflected by the planimetric feature is to be applied, based on the information on the planimetric feature included in the environmental information and a position of the sun; and a notification unit (notification unit 324) that notifies the location where the reflected light is to be applied, predicted by the reflected light prediction unit.

According to (5), the location where the reflected light reflected by the planimetric feature is to be applied is predicted based on the information on the planimetric feature included in the environmental information and the position of the sun, and the predicted location where the reflected light is to be applied is notified. Accordingly, the location where a power generation amount of the solar cell is expected to increase can be presented to a user.

(6) The solar power generation control device according to (5), in which the notification unit notifies a route including the location where the reflected light is to be applied.

According to (6), since the route including the location where the reflected light is to be applied is notified, it is possible to present the user with a route where the power generation amount of the solar cell is expected to increase.

(7) The solar power generation control device according to any one of (1) to (4), the environmental information including information on the planimetric feature, the solar power generation control device further including: a shadow prediction unit (shadow prediction unit 322*c*) that predicts a shadow generated by the planimetric feature in sunlight based on the information on the planimetric feature included in the environmental information and a position of the sun; and a notification unit (notification unit 324) that notifies a location not included in the shadow that is generated by the planimetric feature and that is predicted by the shadow prediction unit.

According to (7), the shadow generated by the planimetric feature in sunlight is predicted based on the information on the planimetric feature included in the environmental information and the position of the sun, and the location not included in the predicted shadow generated by the planimetric feature is notified. Accordingly, the location where a power generation amount of the solar cell is expected to increase can be presented to a user.

(8) The solar power generation control device according to (7), in which the notification unit notifies a route including the location not included in the shadow generated by the planimetric feature.

According to (8), since the route including the location not included in the shadow generated by the planimetric feature is notified, it is possible to present the user with a route where the power generation amount of the solar cell is expected to increase.

(9) The solar power generation control device according to any one of (1) to (8), further including:

a power generation amount acquisition unit (power generation amount acquisition unit 321*b*) that acquires information indicating an amount of electric power predicted to be generated by the solar cell when the vehicle runs along a predetermined route; and a notification unit (notification unit 324) that performs notification based on the information indicating an amount of electric power and acquired by the power generation amount acquisition unit, in which the predetermined route includes a plurality of routes connecting two fixed places, in which the power generation amount acquisition unit acquires, for each route of the plurality of routes, the information indicating an amount of electric power predicted to be generated by the solar cell when the vehicle runs on the route, and in which the notification unit notifies a route having a largest amount of electric power predicted to be generated by the solar cell among the plurality of routes.

According to (9), for each route of a plurality of routes, the information indicating the amount of electric power predicted to be generated by the solar cell when the vehicle runs on the route is acquired, and the route having the largest amount of electric power predicted to be generated by the solar cell is notified. Thus, the route having the largest amount of electric power predicted to be generated by the solar cell can be presented to the user.

(10) A solar power generation control device according to any one of (1) to (9), in which the control unit sets the solar power generation system to the second mode in a case where the prediction unit predicts that the solar radiation state of the vehicle will deteriorate while the solar power generation system is in the first mode.

According to (10), since the solar power generation system is set to the second mode in a case where it is predicted that the solar radiation state of the vehicle will deteriorate while the solar power generation system is in the first mode, it is possible to prevent an occurrence that, in a condition where charging of the power storage device with the electric power generated by the solar cell cannot be expected, the solar power generation system is set to the first mode resulting in an increase in power consumption of the solar power generation system.

The invention claimed is:

1. A solar power generation control device, controlling a solar power generation system configured to charge a power storage device of a vehicle with electric power generated by a solar cell provided in the vehicle,
   an operation mode of the solar power generation system including:
   a first mode in which the power storage device is charged with electric power generated by the solar cell; and
   a second mode in which power consumption of the solar power generation system is lower than in the first mode,
   the solar power generation control device comprising:
   an acquisition unit that acquires environmental information on weather or a planimetric feature around the vehicle;
   a prediction unit that predicts a change in solar radiation state of the vehicle based on the environmental information acquired by the acquisition unit and a moving state of the vehicle; and
   a control unit that controls the operation mode of the solar power generation system based on a prediction result of the prediction unit,
   wherein when the operation mode is the second mode and the prediction unit predicts that scattered light component of sunlight radiated to the vehicle will increase, the control unit sets the solar power generation system to the first mode, and
   wherein the acquisition unit, the prediction unit, and the control unit are each implemented via at least one processor.

2. The solar power generation control device according to claim 1,
   wherein the environmental information includes information on a cloud, and
   wherein the prediction unit predicts a change in the solar radiation state of the vehicle based on a cloud around the vehicle.

3. The solar power generation control device according to claim 2,
   wherein when the cloud around the vehicle is a high-level cloud, the prediction unit predicts that the scattered light component of the sunlight radiated to the vehicle will increase.

4. The solar power generation control device according to claim 3,
   wherein the acquisition unit performs image analysis on a captured image captured by an image-capturing device, which captures an image of surroundings of the vehicle, based on master data defining a characteristic of the high-level cloud, and acquires the information on a cloud indicating that the cloud around the vehicle is the high-level cloud when an image having the characteristic of the high-level cloud defined by the master data is included in the captured image.

5. The solar power generation control device according to claim 1,
   wherein the environmental information includes information on the planimetric feature,
   wherein the solar power generation control device further comprises:
   a reflected light prediction unit that predicts a location where reflected light reflected by the planimetric feature is to be applied, based on the information on the planimetric feature included in the environmental information and a position of the sun; and
   a notification unit that notifies the location where the reflected light is to be applied, predicted by the reflected light prediction unit, and
   wherein the reflected light prediction unit and the notification unit are each implemented via at least one processor.

6. The solar power generation control device according to claim 5,
   wherein the notification unit notifies a route including the location where the reflected light is to be applied.

7. The solar power generation control device according to claim 1,
   wherein the environmental information includes information on the planimetric feature,
   wherein the solar power generation control device further comprises:
   a shadow prediction unit that predicts a shadow generated by the planimetric feature in sunlight based on the information on the planimetric feature included in the environmental information and a position of the sun; and
   a notification unit that notifies a location not included in the shadow that is generated by the planimetric feature and that is predicted by the shadow prediction unit, and
   wherein the shadow prediction unit and the notification unit are each implemented via at least one processor.

8. The solar power generation control device according to claim 7, wherein the notification unit notifies a route including the location not included in the shadow generated by the planimetric feature.

9. The solar power generation control device according to claim 1, further comprising:
   a power generation amount acquisition unit that acquires information indicating an amount of electric power predicted to be generated by the solar cell when the vehicle runs along a predetermined route; and
   a notification unit that performs notification based on the information indicating an amount of electric power and acquired by the power generation amount acquisition unit,
   wherein the predetermined route includes a plurality of routes connecting two fixed places,
   wherein the power generation amount acquisition unit acquires, for each route of the plurality of routes, the information indicating an amount of electric power predicted to be generated by the solar cell when the vehicle runs on the route,
   wherein the notification unit notifies a route having a largest amount of electric power predicted to be generated by the solar cell among the plurality of routes, and
   wherein the power generation amount acquisition unit and the notification unit are each implemented via at least one processor.

10. The solar power generation control device according to claim 1,
    wherein the control unit sets the solar power generation system to the second mode in a case where the prediction unit predicts that the solar radiation state of the vehicle will deteriorate while the solar power generation system is in the first mode.

* * * * *